US011052492B2

(12) United States Patent
Boehm et al.

(10) Patent No.: US 11,052,492 B2
(45) Date of Patent: Jul. 6, 2021

(54) USE OF AN ALLOY AS A BRAZING ALLOY FOR AN ELECTRIC SWITCH BRAZE JOINT, AN ELECTRIC SWITCH BRAZE JOINT, AN ELECTRIC SWITCH AND A METHOD OF PRODUCING AN ELECTRIC SWITCH BRAZE JOINT

(71) Applicant: ABB Schweiz AG, Baden (CH)

(72) Inventors: Moritz Boehm, Fislisbach (CH); Thomas Schmoelzer, Essen (DE); Gunnar Johansson, Västerås (SE)

(73) Assignee: ABB Schweiz AG, Baden (CH)

( * ) Notice: Subject to any disclaimer, the term of this patent is extended or adjusted under 35 U.S.C. 154(b) by 240 days.

(21) Appl. No.: 16/242,450

(22) Filed: Jan. 8, 2019

(65) Prior Publication Data

US 2019/0134760 A1 May 9, 2019

Related U.S. Application Data

(63) Continuation of application No. PCT/EP2017/066928, filed on Jul. 6, 2017.

(30) Foreign Application Priority Data

Jul. 8, 2016 (EP) .................................. 16178564

(51) Int. Cl.
*B23K 35/30* (2006.01)
*B23K 1/00* (2006.01)
(Continued)

(52) U.S. Cl.
CPC .......... *B23K 35/302* (2013.01); *B23K 1/0016* (2013.01); *B23K 35/02* (2013.01);
(Continued)

(58) Field of Classification Search
CPC .............. B23K 35/302; B23K 35/3006; B23K 1/0016; C22C 30/06; C22C 5/06
See application file for complete search history.

(56) References Cited

U.S. PATENT DOCUMENTS 4,009,027 A 2/1977 Naidich et al.
4,409,181 A 10/1983 Coad
(Continued)

FOREIGN PATENT DOCUMENTS

DE 3422329 A1 1/1985
DE 60034418 T2 1/2008
(Continued)

OTHER PUBLICATIONS

Indian Patent Office, Examination Report issued in corresponding Application No. 201947004437, dated Aug. 6, 2020, 5 pp.
(Continued)

*Primary Examiner* — Jessee R Roe
(74) *Attorney, Agent, or Firm* — Taft Stettinius & Hollister LLP

(57) ABSTRACT

Embodiments of the present disclosure relate to an alloy as a brazing alloy for an electric switch braze joint, an electric switch braze joint, an electric switch and a method of producing an electric switch braze joint. The alloy composition of said the alloy consists of at least one element selected from each of group I and group II listed below, and a balance of impurities, Ag, and at least one of Cu, and Zn. Group I encompasses Cd, Mn, Ni, P, Sb, Si, Sn, Ti, and oxides thereof in a total amount of 0.5 to 45.0 wt. %. Group II encompasses Bi, Mo, Te, W, and oxides thereof, oxides of Cu and Zn in a total amount of 0.1 to 15.0 wt. %.

19 Claims, 3 Drawing Sheets

(51) Int. Cl.
  *B23K 35/26*    (2006.01)
  *B23K 35/02*    (2006.01)
  *B32B 15/01*    (2006.01)
  *B32B 15/00*    (2006.01)
  *B23K 35/28*    (2006.01)
  *C22C 5/06*     (2006.01)
  *C22C 9/00*     (2006.01)
  *C22C 30/02*    (2006.01)
  *C22C 30/06*    (2006.01)
  *B23K 101/36*   (2006.01)

(52) U.S. Cl.
  CPC ...... *B23K 35/0222* (2013.01); *B23K 35/0233* (2013.01); *B23K 35/0238* (2013.01); *B23K 35/262* (2013.01); *B23K 35/264* (2013.01); *B23K 35/266* (2013.01); *B23K 35/282* (2013.01); *B23K 35/3006* (2013.01); *B23K 35/3026* (2013.01); *B23K 35/3033* (2013.01); *B32B 15/00* (2013.01); *B32B 15/01* (2013.01); *C22C 5/06* (2013.01); *C22C 9/00* (2013.01); *C22C 30/02* (2013.01); *C22C 30/06* (2013.01); *B23K 2101/36* (2018.08)

(56) References Cited

U.S. PATENT DOCUMENTS

| | | |
|---|---|---|
| 4,624,897 A | 11/1986 | Ito |
| 6,673,310 B2 | 1/2004 | Tadauchi et al. |
| 2013/0248586 A1 | 9/2013 | Harris |
| 2013/0260285 A1* | 10/2013 | Yamauchi .............. B23K 35/28 429/520 |

FOREIGN PATENT DOCUMENTS

| | | |
|---|---|---|
| EP | 0331500 A1 | 9/1989 |
| EP | 0465861 A1 | 1/1992 |
| FR | 2298609 A1 | 8/1976 |
| GB | 933440 | 8/1963 |
| JP | S6313691 A | 1/1988 |
| JP | 2003055058 A | 2/2003 |
| SU | 407691 A1 | 12/1973 |
| WO | 2011073177 A1 | 6/2011 |
| WO | 2015158373 A1 | 10/2015 |

OTHER PUBLICATIONS

Chinese Patent Office, Office Action issued in corresponding Application No. 201730042238.2, dated Aug. 28, 2020, 30 pp.
European Patent Office, International Search Report & Written Opinion issued in corresponding Application No. PCT/EP2017/066928, dated Oct. 17, 2017, 15 pp.
European Patent Office, Search Report issued in corresponding Application No. 16178564.7, dated Nov. 28, 2016, 7 pp.

* cited by examiner

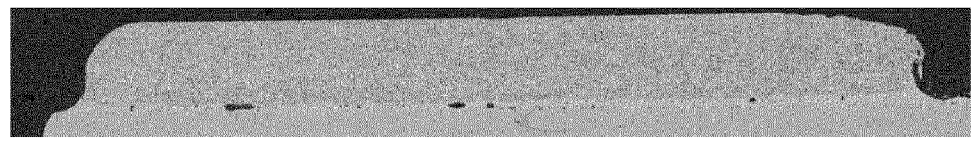
Fig. 6
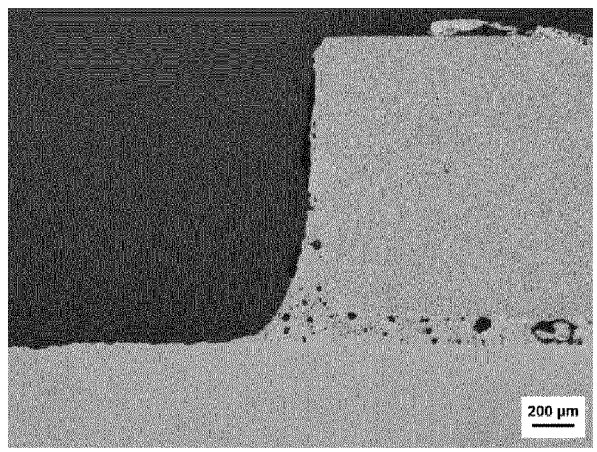
Fig. 7
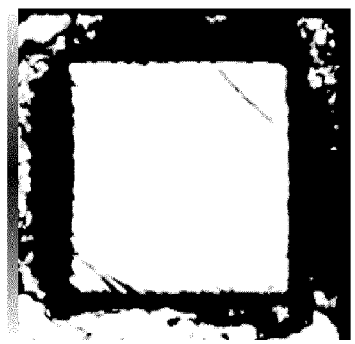 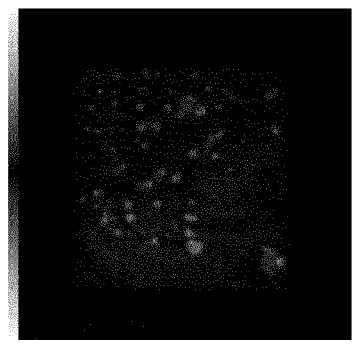
Fig. 8a  Fig. 8b

USE OF AN ALLOY AS A BRAZING ALLOY FOR AN ELECTRIC SWITCH BRAZE JOINT, AN ELECTRIC SWITCH BRAZE JOINT, AN ELECTRIC SWITCH AND A METHOD OF PRODUCING AN ELECTRIC SWITCH BRAZE JOINT

TECHNICAL FIELD

Embodiments of the present disclosure relate to a use of an alloy as a brazing alloy for an electric switch braze joint, an electric switch braze joint, an electric switch and a method of producing an electric switch braze joint.

BACKGROUND

An electric switch usually has two conductive pieces (contacts). For closing (breaking) the circuit the contacts touch and for opening (breaking) the circuit the contacts separate. The conductive pieces are usually connected to an external circuit via carriers (contact carriers). The connection between a contact and a carrier can, for example, be made by brazing.

The material of a contact of an electric switch needs to meet specific requirements. Besides the properties for good contacting, such as high arc erosion resistance, low contact resistance and, depending on the switch type, good arc moving properties and good arc extinguishing capability, the contact material should satisfy further physical, mechanical, and chemical properties, such as high electrical and thermal conductivity, sufficient hardness to resist abrasive wear and mechanical strength, high corrosion resistance. Furthermore, the contact material should have good mechanical workability, sufficient hardness to resist to abrasive wear, mechanical strength. In addition, the contact material should be environmentally friendly and a low-cost material. For this reason, the choice of possible contact materials for electric switches is limited. However, there is hardly any material which meets all of the above-mentioned requirements. Typically, as contact materials in low voltage applications, silver (Ag) based composite materials, such as Ag-metal oxides, are used. Ag-based composite materials exhibit very good contact and switching properties, such as high resistance against welding, low contact resistance and high arc erosion resistance.

Not only the selection of the material of a contact of an electric switch plays an important role but also the material for the carrier needs to satisfy specific requirements for ensuring the reliability of the electric switch during its electrical life. The carrier material should exhibit high electrical and thermal conductivity, good mechanical strength even at elevated temperatures and a high resistance against corrosion. Typically, as carrier material, copper (Cu) based materials are used.

For bonding of the contact to the carrier, various brazing materials can be used. Most of the commonly used brazing materials, such as Cu- and Ag-based brazing materials, exhibit insufficient wetting properties on Ag-metal oxide (in the following also referred to as Ag-MeO) based contact materials. Hence, for improving the wetting behavior, a pure silver backing layer is commonly used to bond the contact material with the carrier material.

In FIG. 1 a schematic assembly of a braze joint is exemplarily shown. The assembly 11 includes a contact material 2, a carrier material 3, a silver backing layer 12 and a brazing alloy 14. The silver backing layer 12 is used for ensuring sufficient wetting of the brazing alloy 14 on the contact material 2. Upon heating, the brazing alloy 14 melts and joins the carrier material 3 and the silver backing layer 12 to form a braze joint between the carrier material 3 and ultimately the contact material 2.

However, Ag is an expensive material and the application of a pure Ag backing layer requires an additional process step during the brazing process. Thus, in view of the above, it is desirable to provide an alloy for an electric switch braze joint which provides the benefits of common brazing materials but which generally avoids the costs typically associated with the application of a silver backing layer.

SUMMARY

In light of the above, according to embodiments disclosed herein, a use of an alloy as a brazing alloy for an electric switch braze joint, an electric switch braze joint and a method of producing an electric switch braze joint are provided.

According to one aspect of the present disclosure a use of an alloy as a brazing alloy for an electric switch braze joint is provided. The alloy composition consists of at least one element selected from each of group I and group II listed below, the balance being impurities and at least one of Ag, Cu, and Zn:
group I: Cd, Mn, Ni, P, Sb, Si, Sn, Ti, and oxides thereof in a total amount of 0.5 to 45.0 wt. %; and group II: Bi, Mo, Te, W, and oxides thereof, oxides of Cu and Zn in a total amount of 0.1 to 15.0 wt. %.

According to a second aspect of the present disclosure an electric switch braze joint is provided. The electric switch braze joint includes an Ag-metal oxide contact material, a carrier material, and a brazed interlayer between the Ag-metal oxide contact material and the carrier material, the electric switch braze joint being formed by brazing with an alloy as a brazing alloy having a composition consisting of: at least one element selected from each of group I and group II listed below, the balance being impurities and at least one of Ag, Cu, and Zn (and preferably Ag and at least one of Cu and Zn, more preferably Ag and Cu, and more preferably at least one of Zn and P from group I):
group I: Cd, Mn, Ni, P, Sb, Si, Sn, Ti, and oxides thereof in a total amount of 0.5 to 45.0 wt. %; and group II: Bi, Mo, Te, W, and oxides thereof, oxides of Cu and Zn in a total amount of 0.1 to 15.0 wt. %.

According to a further aspect, an electric switch is provided. The electric switch has the above-described braze joint.

According to a further aspect, a method of producing an electric switch braze joint is provided. The method of producing an electric switch braze joint includes providing an Ag-metal oxide contact material, providing a carrier material, providing an alloy between the Ag-metal oxide contact material and the carrier material, joining the Ag-metal oxide contact material and the carrier material by brazing with the alloy as a brazing alloy, wherein the alloy composition consists of: at least one element selected from each of group I and group II listed below, the balance being impurities and at least one of Ag, Cu, and Zn (and preferably Ag and at least one of Cu and Zn, more preferably Ag and Cu, and more preferably at least one of Zn and P from group I):
group I: Cd, Mn, Ni, P, Sb, Si, Sn, Ti, and oxides thereof in a total amount of 0.5 to 45.0 wt. %; and group II: Bi, Mo, Te, W, and oxides thereof, oxides of Cu and Zn in a total amount of 0.1 to 15.0 wt. %.

Further aspects, advantages, and features of the present disclosure are apparent from the dependent claims and the description.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following. Typical embodiments are depicted in the drawings and are detailed in the description which follows.

FIGS. 6 and 7 show metallographic cross-sections of electric switch joints according to embodiments of the invention; and FIGS. 8a shows the joint area of an electric switch joint according to embodiments of the invention, measured by ultrasonic non-destructive testing.

FIG. 8b shows a top view of the corresponding contact surface of the joint of FIG. 8a, also measured by ultrasonic non-destructive testing.

DETAILED DESCRIPTION

Figure 1:
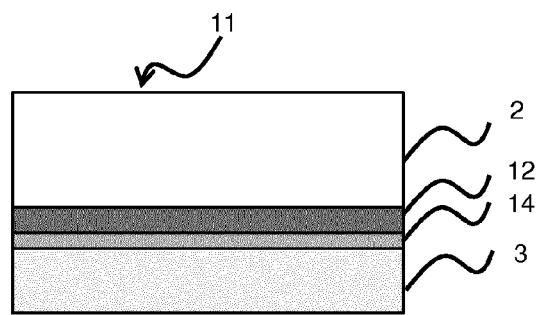
FIG. 1 illustrates a schematic assembly for the formation of a braze joint according to the state-of-the-art.

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Before describing individual embodiments, first some general definitions and aspects of the invention are described, which can each be combined with any other aspect or embodiment.

A braze joint as used herein refers to a joining area which is obtained by joining at least two materials together by brazing. In other words, a braze joint as used herein comprises the materials to be joined and a brazing alloy. The materials to be joined are, for example, the Ag-metal oxide contact material and the carrier material. The braze joint includes an interlayer which is formed from the brazing alloy and at least one of the materials to be joined. The interlayer includes the brazing alloy and at least one of the materials to be joined as such or a compound formed of the brazing alloy and at least one of the materials to be joined. For example, the interlayer may include an intermetallic phase or compound which is formed by the brazing alloy with at least one of the materials to be joined. The interlayer may further include a reaction layer which is formed by the brazing alloy with at least one of the materials to be joined at the interface between the brazing alloy and the respective material(s) to be joined.

Brazing as used herein refers to a joining process of two (or more) materials to be joined using a brazing alloy which blends with the materials to be joined upon melting. The melting temperature of the brazing alloy is lower than the melting temperature of the materials to be joined. The liquefied/molten brazing alloy interacts with the materials to be joined and forms the braze joint during cooling. The interaction of the brazing alloy and the materials to be joined can be described by diffusion processes and formation processes of intermetallic phases and other compounds. The brazing may be performed in vacuum or protective atmosphere. A flux may be used during brazing in order to remove oxides from the brazing surfaces of the materials to be joined and to prevent the formation of oxides during brazing, thereby allowing a thorough wetting of the surfaces of the materials to be joined by the liquefied/molten brazing alloy. However, a fluxless braze is preferred. The fluxless brazing alloy for Ag and Cu base alloys may, for example, contain P.

An electric switch as used herein refers to an electrical component that can disconnect and/or break an electrical circuit, for example for isolating a circuit portion, for interrupting the current or diverting it from one conductor to another. The electric switch has two contacts (conductive pieces) which are connected to an external circuit via carriers (contact carriers). For disconnecting and/or breaking the electrical circuit the contacts separate from each other. For closing the circuit the contacts touch each other. The electric switch as used herein comprises low- and medium-voltage switching devices. Low voltage as used herein refers to a voltage of less than 1 kV AC and medium voltage as used herein refers to a voltage of 1 kV AC to approximately 75 kV AC. Low voltage electrical switching devices comprise, for example, relays, installation and distribution switches, appliances, industrial controls, motor controls, and protective devices. Medium voltage electrical switching devices comprise, for example, load-break switches, motor controls, protective devices, and circuit-breakers for rolling stock. The electric switch may, for example, include a contactor which can be a low- or medium-voltage switching device.

Impurities as used herein refer to typical unavoidable traces of elements which occur during the production process of brazing alloys. Such elements are, for example: C, Fe, P, Si, and S. The upper limit of the total amount of impurities is 1.0 wt. %, preferably 0.5 wt. %, and more preferably 0.15 wt. %. These traces of elements do not contribute to or modify the actual purpose of the brazing alloy.

Braze filler materials based on the Cu—Ag—P system are widely used to form braze joints between carrier materials and electrical contacts. If an Ag-MeO based contact material with a pure Ag backing layer is used, the brazed joint formed between the backing layer and the carrier is able to sustain the required number of operations for most devices and electrical test duties. Such a brazed joint typically exhibits bonded areas in the range of 95% or more, depending on the brazing process used. On the other hand, if the same braze filler is used to directly braze the Ag-MeO based contact material, the bonded area will be in the range of 50% or less, again depending on the parameters. Further experiments were carried out by using Ag—Cu—Zn braze fillers, which showed a similar behavior. It was shown that primarily, the wetting behavior of the braze fillers on the Ag-MeO based contact material is significantly inferior compared to pure Cu, Ag and various other alloys. This inferior wetting behavior can be explained by the influence of the metal-oxidic compound used in the Ag-MeO based contact material.

The inventors carried out experiments using brazing alloys which have at least one of Cu, Ag and Zn as basis. They found out that the wetting behavior can be greatly increased by adding certain additives. These additives can be divided into two groups, the groups consisting of the following elements: group I: Cd, Mn, Ni, P, Sb, Si, Sn, Ti, and oxides thereof; and group II: Bi, Mo, Te, W, and oxides thereof, oxides of Cu and Zn.

The effects of the additives of the first group are primarily based on: reducing the melting temperature, removing surface oxides and improving the flowability of the brazing alloy. The effect of the additives of the second group is based on the improved wetting behavior of the brazing alloy on Ag-MeO based materials, which directly increases the bonded area fraction in the formed braze joint.

By adding at least one element selected from each of group I and group II the inventors found that the wetting behavior and flowability of the resulting alloy can be drastically improved and that the application of a silver backing layer can be omitted when this alloy is used as a brazing alloy. Chemical reactions between the brazing alloy, containing the aforementioned additives, and the Ag-MeO based contact material lead to formation of intermetallic phases and chemical compounds along the interface between the brazing alloy and the Ag-MeO based contact material during the brazing process. These compounds can improve the wetting behavior even further.

The alloy composition includes at least one element selected from group I in a total amount of 0.5 to 45.0 wt. %. Preferably, the lower limit of the total amount is 5.0, more preferably 10.0 wt. %, and even more preferably 15.0 wt. %. Preferably, the upper limit of the total amount is 20.0, more preferably 15.0 wt. %, and even more preferably 10.0 wt. %. Preferably, the alloy composition includes at least one element selected from group I in a total amount 5.0 to 20.0 wt. %.

Further, the alloy composition includes at least one element selected from group II in a total amount of 0.1 to 15.0 wt. %. Preferably, the lower limit of the total amount is 0.5 wt. %, more preferably 1.0 wt. %, and even more preferably 1.5 wt. %. Preferably, the upper limit of the total amount is 8.0, more preferably 6.0 wt. %, and even more preferably 4.0 wt. %. Preferably, the alloy composition includes at least one element selected from group II in a total amount 0.5 to 8.0 wt. %.

The preferred additives from group II are at least one of Bi, Mo, Te, W, oxides thereof, and oxides of Cu and Zn. For example, such preferred oxides include Bi2O3, MoO3, TeO2, WO3, CuO, and ZnO. Group II preferably consists of Bi, Mo, Te, W, and oxides thereof, and even more preferably of Mo and W and oxides thereof. Typical oxides of group II include: $Bi_2O_3$, CuO, $MoO_3$, $TeO_2$, $WO_3$, and ZnO.

As described above, the balance of the alloy composition consists of impurities and at least one of Ag, Cu, and Zn. Preferably, the total amount of the at least one of Ag, Cu, and Zn is 20.0 to 80.0 wt. %, more preferably 30.0 to 70.0 wt. %. According to embodiments described herein, the amount of Zn in the balance is 5.0 to 40.0 wt. %, preferably 10.0 to 30.0 wt. %.

According to a preferred aspect, the alloy composition has optionally Zn: up to 40.0 wt % (preferably at least 5.0 wt %, 10.0 wt % or 15.0 wt %, and preferably up to 35.0 wt % or up to 30.0 wt %); optionally P: up to 15.0 wt % (preferably at least 1.0 wt %, 3.0 wt % or 5.0 wt %, and preferably at most 11.0 wt % or 8.0 wt %); optionally one or more other elements from group I: total amount up to 15.0 wt % (preferably at least 0.2 wt % or 0.5 wt %; preferably at most 15.0 wt %, 12.0 wt % or 10.0 wt %); optionally at least one of the elements from group II: total amount up to 10.0 wt % (preferably at least 0.1 wt % or 0.5 wt %; preferably at most 10.0 wt % or 6.0 wt %), and a balance of Ag and Cu. In the balance, the total amount of Ag and Cu (and optionally Zn) is preferably 20.0 wt % to 80.0 wt %. The total Cu and Ag content is preferably at least 40.0 wt % or even 50.0 wt %; and preferably at most 95.0 wt %. The Ag content is preferably at least 20.0 wt %, and the Cu content is preferably at least 15.0 wt %. In case of P being contained in the alloy, the Ag content is preferably at least 10.0 wt %, and the Cu content is preferably at least 50.0 wt %.

According to embodiments described herein, the above-described alloy is used for a braze joint which is formed with an Ag-metal oxide contact material and a carrier material. In other words, the braze joint is formed by interaction of the alloy with a portion of the Ag-MeO contact material and a portion of the carrier material. For successful brazing, one component of the base material, i.e. the Ag-MeO contact material and the carrier material, respectively, must be at least partially soluble in one or more components of the brazing alloy. Typical reactions between the brazing alloy and the carrier include, for example, limited dissolution of the carrier material in the brazing alloy and formation of complex solid solutions, for example a Cu-rich Cu—Ag—P or Ag—Cu—Zn phase. Typical reactions between the brazing alloy and the Ag-MeO contact material include dissolution of the Ag in the brazing alloy and formation of complex solid solutions for example an Ag-rich Cu—Ag—P or Ag—Cu—Zn phase. In addition, the metal oxide component can form complex oxides including additives from group I and group II. Furthermore, solid solutions of Ag, Cu, Zn, P and additives from group I and group II may be formed near or at the interface of the braze joint to the Ag-MeO contact material and/or the carrier material. The Ag-metal oxide contact material and the carrier material, and hence the braze joint, preferably form a portion of the electric switch.

According to embodiments described herein, the Ag-metal oxide contact material comprises at least one of the following: Ag—CdO, Ag—$SnO_2$, and Ag—ZnO. Optionally, the Ag-metal oxide contact material is doped with at least one of the following dopants: $Bi_2O_3$, CuO, MgO, $MoO_3$, $RuO_2$, $Sb_2O_3$, TaC, $Ta_2O_5$, $TeO_2$, $WO_3$, and ZnO. The total amount of dopants in the Ag-metal oxide contact material is 3.0 wt. % or less, preferably 2.0 wt. % or less, more preferably 1.0 wt. % or less. For obtaining a positive effect, the lower limit of the total amount of dopants in the Ag-metal oxide contact material is 0.001 wt. %, preferably 0.01 wt. %, more preferably 0.1 wt. %.

According to embodiments described herein, the carrier material comprises at least one of the following: Al, Al-based alloy, Cu, Cu-based alloy, Fe-based alloy, and steel. Optionally, the carrier material is plated with one of the following: Ag, Cu, Ni, and Sn.

According to embodiments described herein, an electric switch braze joint includes the above-described Ag-metal oxide contact material, the above-described carrier material, and a brazed interlayer between the Ag-metal oxide contact material and the carrier material, the electric switch braze joint being formed by brazing with an alloy having a composition as described above. The brazed interlayer is a blend of the contact material, the carrier material and the brazing alloy which is formed at the time when the contact material is joined with the carrier material by brazing using the above-described brazing alloy. The brazed interlayer may have a structure, for example microstructure and/or composition, different from the brazing alloy before brazing. The brazed interlayer may include intermetallic phases and chemical compounds formed from the brazing alloy with at least one of the contact material and the carrier material. These intermetallic phases and chemical compounds are preferably formed at the interface of the brazed interlayer and the Ag-MeO contact material and/or the carrier material. The brazed interlayer may further include a reaction layer formed from the brazing alloy with at least one of the Ag-MeO contact material and the carrier material at the interface between the brazing alloy and the Ag-MeO contact material and/or the carrier material. The reaction layer may include intermetallic phases and chemical compounds. The formation of such a reaction layer may further improve the wetting behavior of the brazing alloy.

A common feature for characterizing brazing alloys are the solidus and liquidus temperatures. These temperatures are directly determined by the chemical composition of the alloy, and are important for the behavior of the alloy during the joint formation.

The brazing alloys used in the present invention for electric switch braze joints preferably have a solidus temperature of at least 600° C. and/or a liquidus temperatures of not more than 950° C. Preferred solidus temperatures are at least 650° C. preferably 700° C., more preferably 750° C. The liquidus temperatures are typically not more than 900° C., preferably not more than 850, more preferably not more than 800° C.

In the case of Cu—Ag—P and Ag—Cu—Zn basis system the ranges of solidus and liquidus temperatures are between 650-850° C. and 600-750° C., respectively.

From the practical point of view during the formation of brazing alloys, also the melting range (i.e. the temperature range between the liquidus and solidus temperature) influences the application of the brazing alloy. In particular, the melting range has an impact on brazing alloy flowability. The melting range of the brazing alloy is preferably at most 150° C., preferably at most 100° C., more preferably at most 80° C., more preferably at most 50° C. A preferred lower limit for the melting range is 20° C. or 30° C.

The joint can be formed by any brazing method; preferred brazing methods include resistance brazing and induction brazing.

Figure 2:
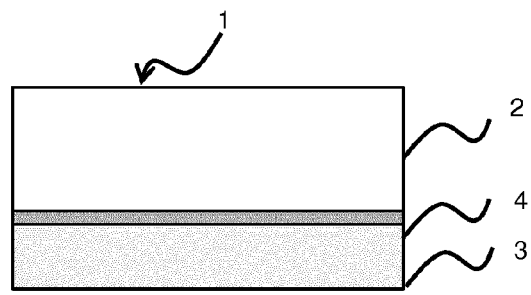
FIG. 2 shows a schematic assembly for the formation of an electric switch braze joint according to embodiments described herein.
Figure 3:
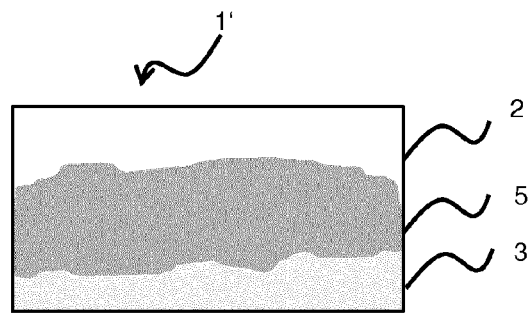
FIG. 3 shows a schematic illustration of an electric switch braze joint according to embodiments described herein.

FIG. 2 shows a schematic assembly for the formation of an electric switch braze joint according to embodiments described herein. Just as the schematic illustration shown in FIG. 1, the assembly 1 of FIG. 2 includes a contact material, i.e. an Ag-metal oxide contact material 2, (in the following referred to as "contact material"), a carrier material 3, and a brazing alloy 4 in between. For forming the electric switch braze joint, the brazing alloy 4 melts upon heating and blends with at least a portion of the carrier material 3 and at least a portion of the contact material 2 without the need of a silver backing layer. In FIG. 3 an electric switch braze joint 1' according to embodiments described herein is schematically illustrated. The electric switch braze joint 1' may, for example, result from brazing the assembly 1 according to FIG. 2 using the brazing alloy 4 shown in FIG. 2. As indicated in FIG. 3, the electric switch braze joint 1' is formed from the contact material 2, the carrier material 3, and a brazed interlayer 5 between the contact material 2 and the carrier material 3. The brazed interlayer 5 is preferably formed from at least a portion of the contact material 2, at least a portion of the carrier material 3, and the brazing alloy 4. The brazed interlayer 5 is a blend of the contact material 2, the carrier material 3 and the brazing alloy 4. The brazed interlayer 5 has structure, in particular a microstructure and a composition being different from the brazing alloy 4 in a state before brazing.

According to embodiments described herein, an electric switch has the braze joint as described above.

According to embodiments described herein, a method of producing an electric switch braze joint includes providing an Ag-metal oxide contact material, for example the above-described Ag-metal oxide contact material, providing a carrier material, for example the above-described carrier material, providing the above-described alloy between the Ag-metal oxide contact material and the carrier material, joining the Ag-metal oxide contact material and the carrier material by brazing with the alloy as a brazing alloy.

According to embodiments described herein, the brazing in the above-described method of producing an electric switch braze joint is performed by induction brazing, resistance brazing, torch brazing, manual torch brazing or furnace brazing.

During induction brazing, the heat for melting the brazing alloy is generated by an induction coil fed by a medium frequency generator. The created electromagnetic alternating field heats all conductive materials in the joint components, such as the contact material, the carrier material and the brazing alloy. For induction brazing according to embodiments described herein, an induction brazing apparatus is used.

For resistance welding, a resistance welding apparatus is used according to embodiments described herein. The source of heat is the resistive heating under electric currents. An electric current flows through at least one of the carrier material, the contact material and the brazing alloy. Direct resistance brazing refers to heating of the brazing alloy using resistive heating under electric currents. Indirect resistance brazing refers to heating of the contact material and/or the carrier material using resistive heating under electric currents. Both direct and indirect resistance brazing is used to melt the brazing alloy.

Torch brazing according to embodiments described herein refers to manual, machine, or automatic torch brazing. Torch brazing is a brazing process in which the heat is applied by a gas flame placed on or near the material to be brazed.

For furnace brazing, the materials to be brazed and the brazing alloy are placed in a furnace. Through the heat the alloy melts and forms a firm bond between the materials to be brazed and the brazing alloy. In the furnace, a specific atmosphere is used. This atmosphere depends on the contact material, the carrier and the brazing alloy. Typical atmospheres include inert gas, vacuum or reducing atmospheres, for example hydrogen.

For all of the above-described methods of producing an electric switch braze joint, a flux is optionally applied in order to prevent oxidation.

According to embodiments described herein, the above-described brazing process has an average brazing time of 0.1-5 seconds, except for torch brazing and furnace brazing. In the torch brazing process, the average brazing time is 3-100 seconds, and in the furnace brazing process the average brazing time is 100-1000 seconds.

According to embodiments described herein, the alloy, before brazing, may be in the form of one of the following: a rod, a wire, a foil, a powder, a paste, a tape, a strip and a preform.

A series of experiments were conducted in order to find an alloy for an electric switch braze joint which provides the benefits of common brazing materials but which generally avoids the costs typically associated with the application of a silver backing layer.

While these experiments are useful to demonstrate certain features and aspects of the present disclosure, they should in no way be interpreted as an exhaustive demonstration of all of the various aspects of the present disclosure. Each example is provided by way of explanation and is not meant as a limitation. Many of the advantages of the present disclosure can readily be achieved with variations from the experiments described herein, including, without limitation, the selection of the materials, and the methods and operating parameters used to combine those materials. Accordingly, the present disclosure should be broadly construed to include all such modifications and equivalents thereto that are encompassed by the claims.

Figure 4:
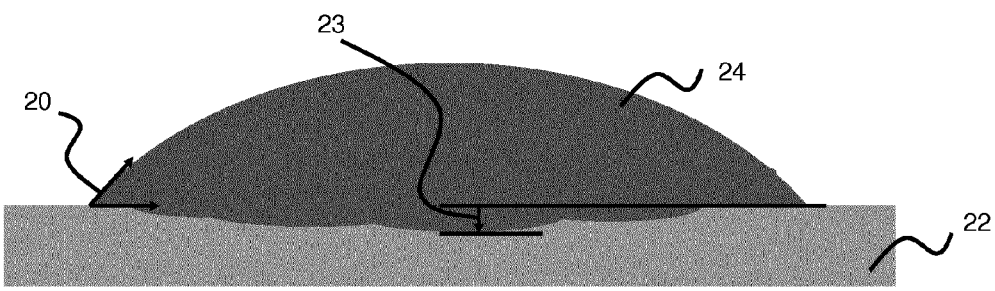
FIG. 4 shows a schematic illustration of the measured features in wetting tests of brazing alloys according to embodiments described herein.

The inventors studied the wetting behavior of Cu—Ag-based brazing alloys on Ag-MeO based contact materials, such as Ag—$SnO_2$, by performing wetting experiments. Contact material substrate parts were prepared by a press-sinter-repress process. The brazing alloys were produced by mixing the respective powders and pressing them into small pellets with a diameter of 6 mm or less. The pressed pellets were placed on the substrates and heated to their respective melting temperature. These samples were then cooled down and characterized. The wetting angle was measured, as well as the interfacial area, in particular a reaction depth of the brazing alloy, was analyzed (see Table 1). FIG. 4 shows a schematic illustration of the measured features of the respective tested brazing alloy during testing of their wetting behavior. In detail, FIG. 4 shows the brazing alloy 24, the contact material 22 and the features of the wetting angle 20 measured in °, and the reaction depth of the brazing alloy 23 measured in μm.

In the following, results from an example experiment from the aforementioned series of wetting experiments will be shown in more detail. For the hereby tested samples, the commercial brazing alloy BCuP-5 serves as a reference and comparative example (labeled as material A in Table 1 and FIG. 5). Its composition is 80 wt. % Cu, 15 wt. % Ag and 5 wt. % P. For the inventive examples, different oxide additives were added to the basic brazing alloy (labeled as materials B-E in Table 1 and FIG. 5). These brazing alloys were tested in order to study the influence of the oxide additives on the wetting behavior compared to the reference brazing material A. In Table 1, the results of this experiment are shown. Depending on the oxide additive, a certain reaction depth into the substrate is observed. The wetting angle can be measured in-situ or, after the experiment, by metallographic analysis, while the reaction depth can only be measured by metallographic analysis. A wetting angle in the range <30° was evaluated as good wetting behavior of the respective brazing alloy, whereas a wetting angle >80° is considered as bad wetting behavior. The reaction depth should be small so as to limit the influence on the contact material and the consumption of the contact material.

As can be seen from Table 1, the addition of $WO_3$ (see brazing alloy E of Table 1) as oxide additive resulted in a drastic improvement of the wetting behavior while also resulting in a lower reaction depth compared to the other oxide additives.

TABLE 1

| Composition [wt %] | Label | Mean wetting angle [°] | Maximum reaction depth [μm] |
|---|---|---|---|
| Cu—Ag—P (BCuP-5) | A | 76 | 10 |
| Cu—Ag—P + CuO | B | 48 | 200 |
| Cu—Ag—P + $Bi_2O_3$ | C | 88 | 430 |
| Cu—Ag—P + CuO + $Bi_2O_3$ | D | 49 | 490 |
| Cu—Ag—P + $WO_3$ | E | 20 | 70 |

Figure 5:
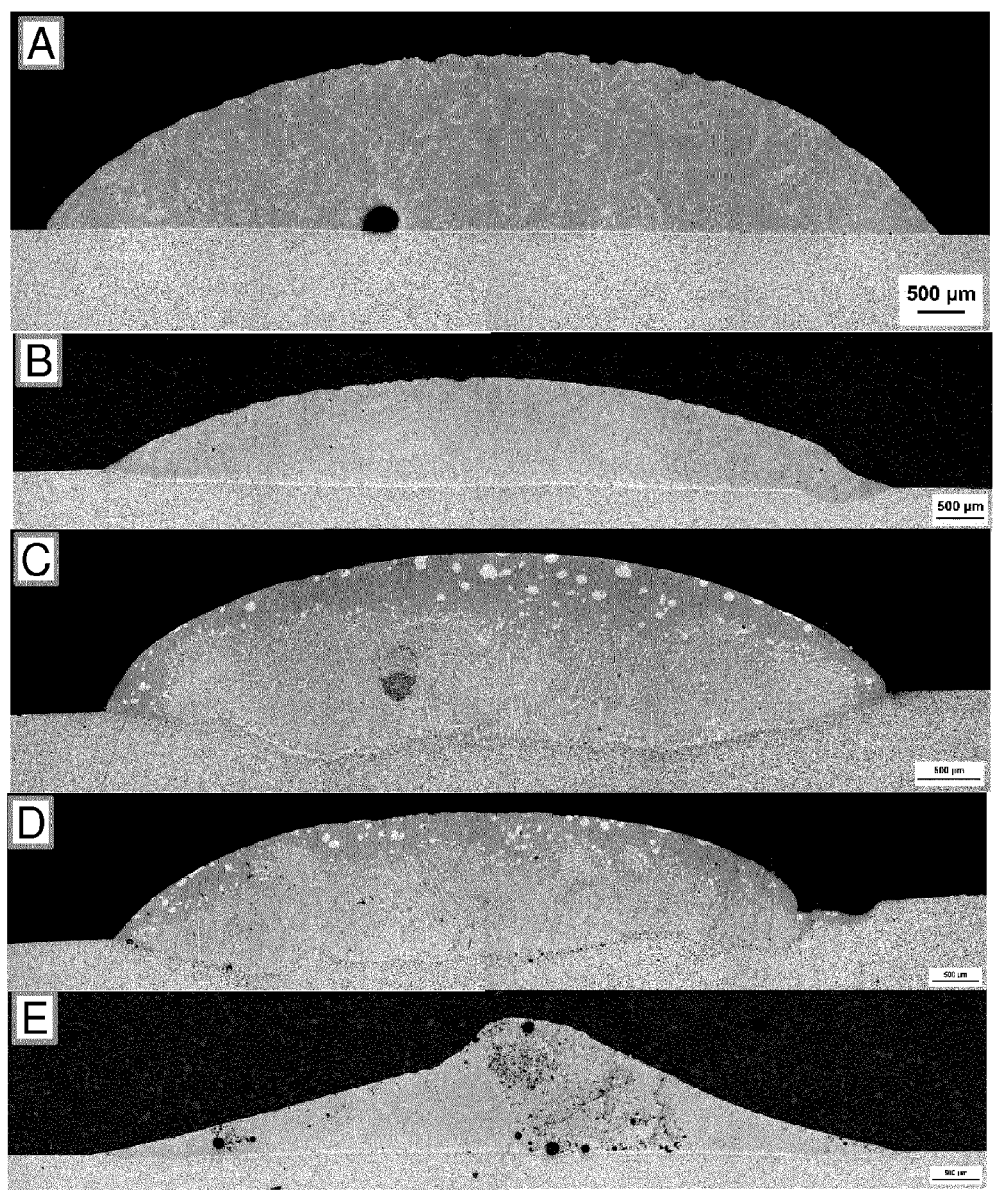
FIG. 5 shows micrographs of brazing alloys according to embodiments described herein on a substrate material.

In FIG. 5, micrographs of the aforementioned experiments (see Table 1) are shown. As can be seen from these images, the connection between brazing alloy E ($WO_3$ additive) and the contact material exhibits a wetting angle of about 20° and a limited reaction depth of about 70 μm. Hence, brazing alloy E exhibits excellent wetting behavior.

It is to be noted that the micrographs in FIG. 5 show gas pores (black circular portions) in the brazing alloy and the interface between the brazing alloy and the contact material. Furthermore, the micrograph depicting brazing alloy C shows an artifact in the brazing alloy region which occurred during metal lographic preparation of the respective sample.

Further examples of brazing alloys for the use according to the invention are given in the following. These brazing alloys have a chemical composition having a Cu—Ag—P and/or Ag—Cu—Zn alloy as a base system, and in addition they contain additives according to the invention as described below:

Ex. 1: 74% Cu, 18 Ag % 6% P, 1% WO3, 1% Bi2O3
Ex. 2: 77.5% Cu, 14.5 Ag %, 5% P, 2% CuO, 1% Bi2O3
Ex. 3: 39% Cu, 24 Ag %, 34% Zn, 2% WO3, 1% Bi2O3
Ex. 4: 20% Cu, 53 Ag %, 21% Zn, 3% CuO, 2% Sn, 1% Bi2O3
Ex. 5: 19% Cu, 51 Ag %, 20% Zn, 5% WO3, 2% Sn, 2% Bi2O3, 1% CuO.

Herein, unless otherwise noted, % is equivalent to wt %.

The brazing alloys according to the examples 1 to 5 were found to exhibit advantageous wettability properties suitable for electric switch braze joints on Ag—SaO2 composite material.

FIGS. 6 and 7 show side views of electric switch braze joints using the alloy of examples 1 and 2, respectively. As can be seen, a reliable joint without excessive defects is formed. The braze fillet shown in FIGS. 6 and 7 indicate good flowability and wetting angle, and the Figures also show a limited penetration depth (no visible electrode erosion). Hence, these Figures show that a reliable joint could be formed by using the brazing alloy according to the invention, even without a Ag layer on the parts to be soldered.

FIG. 8*a* shows a top view of a part surface of a contact material of an electric switch, bonded using the alloy of example 2. The white square corresponds to the contact surface and thereby also to the joint area.

FIG. 8*b* shows an image of a joint area of the electric switch braze joint of the electric switch of FIG. 8*a*. The FIG. 8*b* shows the measurement of the bonded area obtained by ultrasonic testing. Here, the black portions indicate the bonded area; the white spots indicate defects (here: pores) within the braze joint. The FIG. 8*b* reveals about 95% bonded area, which is an indication of an excellent bond.

The invention claimed is:
1. An electric switch braze joint, comprising
an Ag-metal oxide contact material,
a carrier material; and
a brazed interlayer between the Ag-metal oxide contact material and the carrier material, the electric switch braze joint being formed by brazing with an alloy as a brazing alloy having a composition consisting of:
at least one element selected from each of group I and group II listed below,
the balance being Ag and impurities, and optionally at least one of Cu, and Zn;
group I: Cd, Mn, Ni, P, Sb, Si, Sn, Ti, and oxides thereof in a total amount of 0.5 to 45.0 wt. %; and
group II: Bi, Mo, Te, W, and oxides thereof, oxides of Cu and Zn in a total amount of 0.1 to 15.0 wt. %.

2. The electric switch braze joint according to claim 1, wherein
the balance is Aq and Cu, optionally at least one of P and Zn, and impurities;
group I: Cd, Mn, Ni, P, Sb, Si, Sn, Ti, and oxides thereof in a total amount of 0.5 to 45.0 wt. %; and
group II: Bi, Mo, Te, W, and oxides thereof, oxides of Cu and Zn in a total amount of 0.1 to 15.0 wt. %.

3. The electric switch braze joint according to claim 2, wherein group I: Cd, Mn, Ni, P, Sb, Si, Sn, Ti, and oxides thereof in a total amount of up to 15.0 wt. %.

4. The electric switch braze joint according to claim 2, wherein
the balance is Cu—Ag—P, optionally Zn, and impurities; and
group II: Bi, Mo, Te, W, and oxides thereof, oxides of Cu and Zn in a total amount of 0.1 to 15.0 wt %.

5. The electric switch braze joint alloy according to claim 4, wherein group II: Bi2O3, CuO, MoO3, TeO2, WO3 and ZnO in a total amount of 0.1 to 15.0 wt. %.

6. The electric switch braze joint according to claim 1, wherein the solidus temperature of the brazing alloy is at least 600° C. and a liquidus temperature of the brazing alloy is less than 950° C.

7. The electric switch braze joint according to claim 1, wherein the brazing alloy can be used without flux.

8. The electric switch braze joint according to claim 1, wherein group I consists of Cd, Mn, Ni, P, Sb, Si, Sn, Ti, and oxides thereof in a total amount of 5.0 to 20.0 wt. %.

9. The electric switch braze joint according to claim 8, wherein group II consists of Bi, Mo, Te, W, and oxides thereof, oxides of Cu and Xn in a total amount of 0.5 to 8.0 wt. %.

10. The electric switch braze joint according to claim 8, wherein group II consists of Bi, Mo, Te, W, and oxides thereof in a total amount of 0.5 to 8.0 wt. %.

11. The electric switch braze joint of claim 1, wherein the balance is AG and CU, impurities and at least one of P and Zn.

12. The electric switch braze joint according to claim 11, wherein, in the brazing alloy, the total amount of the at least one of Cu, Ag and Zn is 20.0 to 80.0 wt. %.

13. The electric switch braze joint according to claim 12, wherein, in the brazing alloy, the amount of Zn in the balance is 5.0 to 40.0 wt. %.

14. The electric switch braze joint according to claim 1, wherein at least one of a) and b) is fulfilled:
a) the Ag-metal oxide contact material comprises at least one of the following: Ag—CdO, Ag—SnO2, and Ag—ZnO; and
b) the carrier material comprises at least one of the following: Al, Al-based alloy, Cu, Cu-based alloy, Fe-based alloy, and steel.

15. An electric switch, having the braze joint according to claim 1.

16. A method of producing an electric switch braze joint, comprising
providing an Ag-metal oxide contact material,
providing a carrier material,
providing an alloy between the Ag-metal oxide contact material and the carrier material, joining the Ag-metal oxide contact material and the carrier material by brazing with the alloy as a brazing alloy, wherein
the alloy composition consists of:
at least one element selected from each of group I and group II listed below,
the balance being Ag, optionally at least one of Cu, and Zn, and impurities;
group I: Cd, Mn, Ni, P, Sb, Si, Sn, Ti, and oxides thereof in a total amount of 0.5 to 45.0 wt. %; and
group II: Bi, Mo, Te, W, and oxides thereof, oxides of Cu and Zn in a total amount of 0.1 to 15.0 wt. %.

17. The method of producing an electric switch braze joint according to claim 16, wherein
at least one of a) and b) is fulfilled:
a) the Ag-metal oxide contact material comprises at least one of the following: Ag—CdO, Ag—SnO2, and Ag—ZnO; and
b) the carrier material comprises at least one of the following: Al, Al-based alloy, Cu, Cu-based alloy, Fe-based alloy, and steel.

18. The method of producing an electric switch braze joint according to claim 17, wherein the brazing is performed by induction brazing, resistance brazing, torch brazing, or furnace brazing.

19. The method of producing an electric switch braze joint according to claim 16, wherein the brazing is performed by induction brazing, resistance brazing, torch brazing, or furnace brazing.

* * * * *